July 29, 1924.

E. G. KIMMICH 1,503,453

BELT AND METHOD OF MAKING THE SAME

Filed Nov. 17, 1921

Inventor
Elmer G. Kimmich

By R. D. Inogue
Attorney

Patented July 29, 1924.

1,503,453

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

BELT AND METHOD OF MAKING THE SAME.

Application filed November 17, 1921. Serial No. 515,859.

*To all whom it may concern:*

Be it known that I, ELMER G. KIMMICH, a citizen of the United States, residing at Akron, in the county of Summit and State of Ohio, have invented new and useful Improvements in Belts and Methods of Making the Same, of which the following is a specification.

My invention relates to belts and it has, for its primary object, the provision of a belt formed of a suitable fabric so treated as to impart a high co-efficient of friction to the driving surface of the belt and to maintain a proper degree of flexibility in the formed structure.

My invention broadly contemplates the construction of belts by utilizing fabric, such as closely woven duck, treated with a vulcanizable material, such as rubber, to constitute the central body portion of the belts. The driving surfaces of the belt are provided by utilizing a fabric, similar to that embodied in the main body portion of the belt, which is treated only on one side with a vulcanizable material, such as rubber, and upon its other side with nitrocellulose.

I am aware that belts have been constructed heretofore by utilizing nitrocellulose in their structure, but all such belts, of which I am aware, have either been formed by employing the nitrocellulose throughout the entire body portion of the belt or by merely utilizing it as a weather-proof coating upon its exposed side which does not function in the driving action of the belt. My invention, however, is primarily concerned with utilizing the high co-efficient of friction imparted to a belt surface by employing nitrocellulose, without incurring the disadvantages attending the utilization of nitrocellulose throughout the entire body portion of the belt.

By constructing the belt in accordance with my invention, the very desirable characteristics attained in a belt structure of fabric treated with a vulcanizable material, such as rubber, are realized, in addition to securing a greatly increased power capacity by utilizing a superior driving surface.

A further advantage of my invention resides in the fact that the driving surface of the belt may be easily renewed and, consequently, its life may be greatly prolonged.

Figure 1:
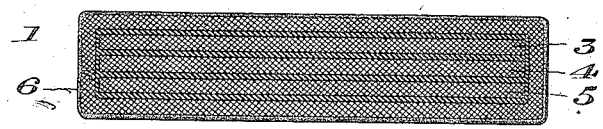
Figure 2:
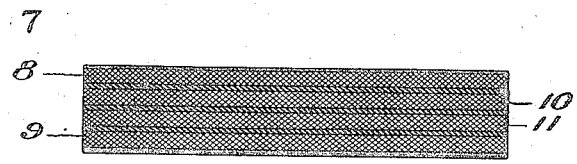

Other and ancillary objects will be apparent from the following detailed description of my invention in conjunction with the accompanying drawings, in which:

Fig. 1 is a transverse sectional view of a belt constructed in accordance with my invention; and Fig. 2 is a similar sectional view illustrating a modified method of construction.

As above stated, my invention contemplates the construction of a belt by utilizing any suitable form of fabric, but I prefer to use a tightly woven fabric, such as the so-called "silver duck," a plurality of strips of which may be frictioned or treated with rubber on both sides. A number of layers of the duck so treated are superposed one upon the other to provide a central body portion of the desired thickness. Another strip of fabric, or duck, of the same kind of material as that employed in the body portion, is treated upon one side only with a vulcanizable material, such as rubber, and this strip is applied to the superposed layers with its untreated surface exposed. The body thus formed may be subjected to heat to vulcanize the rubber and to form a unitary body. The exposed surfaces of the belt thus formed are then treated with nitrocellulose mixed with any of the usual plastifiers, such as castor oil, camphor, and the like, in the usual solvents, such as amylacetate, alcohol, ethylacetate, benzol and mixtures of these.

It will, of course, be appreciated that it is necessary to utilize some plastifier in the nitrocellulose in order to obtain a film having the proper degree of flexibility. Of course, the proportions of nitrocellulose and plastifier govern, to a certain extent, the tensile strength and its co-efficient of friction, but the proper proportions do not vary to such a wide extent but that a suitable film of nitrocellulose may be readily obtained by trying a few mixtures.

In order to insure a clear understanding of my invention, a plurality of belts are illustrated in the drawings, which may be constructed by following the teaching of my invention. In Fig. 1 is shown a belt 1 comprising a plurality of layers 3, 4 and 5 of a textile fabric, such as duck, which are treated with a vulcanizable material, such as rubber. The layers are then superposed, one upon the other. Another strip of fabric 6 is treated upon one surface with a vulcanizable material, such as rubber and wrapped about the layers 3, 4 and 5 with its untreated surface exposed. The body thus formed is subjected to heat and possibly to pressure to vulcanize the rubber and form a unitary body. The layer 6 is then treated with nitrocellulose mixed with a plastifier, which may be applied to the entire exterior surface of the layer or only to the surface designed as a driving or working surface. The remaining portion of the material, if desired, may be treated with a suitable water-proofing substance of any suitable or desired kind. I have found that suitable proportions of nitrocellulose and plastifier are 5 part nitrocellulose to 8 parts castor oil, by weight of the materials. Of course, as above stated, these proportions are merely illustrative and may be varied to obtain the exact characteristics desired in the film or coating that is formed by the mixture.

In Fig. 2 is shown a belt 7, which is constructed of a plurality of strips of fabric of the same width, in contradistinction to the belt shown in Fig. 1. In this type of structure, the top and bottom layers 8 and 9, respectively, are treated upon one side with rubber or other suitable vulcanizable material and the intermediate layers 10 and 11 are treated upon both sides with rubber. The strips thus prepared are superposed and subjected to heat to unite them, after which a coating of nitrocellulose is applied to the exposed surfaces of the strips 8 and 9. However, only one of the strips need be coated with nitrocellulose, if it is desired to use a different coating to waterproof the belt.

My invention is not particularly concerned with the manner of assembling the treated layers of material, but it is particularly concerned with the manner of treating the material to obtain a belt of high power capacity a proper degree of flexibility and relatively great durability. Since the coating of nitrocellulose may be applied in various manners, such as by dipping or by means of a brush, it will be appreciated that in case the coating wears off during service, another coating may be applied to entirely renew the belt to its original condition.

In addition to the application of my invention to the construction of new belts, it may be utilized to advantage in the treatment of belts which have been in service. For example, an ordinary rubber and fabric belt may be greatly improved, or renewed, by buffing the rubber from its driving surface and applying a coating of nitrocellulose thereto. The increased power capacity that is imparted by the nitrocellulose makes it desirable to treat belts that have been built without it, even though such belts have not deteriorated to a noticeable extent from service. It is only necessary, to insure satisfactory results, that care be taken to clean the fabric surface thoroughly of the rubber or other surfacing material. This may be accomplished without injuring the fabric.

The idea of buffing or cleaning the surface of a fabric belt treated with vulcanized rubber may also be utilized to advantage in constructing new belts. For example, an ordinary rubber and fabric belt may be made without selecting the fabric so carefully or taking precautionary means to prevent the driving surface from being rubber treated. The driving surface may then be cleaned and treated with nitrocellulose, as herein described.

Although I have shown and described a plurality of belts that may be constructed in accordance with my invention, it is obvious that minor changes may be made in the manner of treating the material, in the proportions of the ingredients utilized and in the manner of assembling the material, without departing from the spirit or scope of my invention and I desire, therefore, that no limitations shall be imposed except such as are indicated in the appended claims.

What I claim is:

1. A belt comprising superposed layers of fabric united by a vulcanized material and an exterior coating of nitrocellulose applied thereto.

2. A belt comprising a plurality of superposed layers of fabric treated with a vulcanizable material and an enclosing layer of fabric treated on its interior surface with a vulcanizable material and treated on its exterior surface with nitrocellulose.

3. A belt comprising superposed layers of fabric treated with vulcanized rubber and an enclosing layer of fabric treated on its interior surface with vulcanized rubber and treated on its exterior surface with nitrocellulose.

4. A belt comprising a central body portion of flexible material treated with a vulcanizable material and a cover therefor having its driving surface treated with nitrocellulose.

5. A belt comprising a central body portion of flexible material treated with a vulcanizable material and a cover therefor having its exposed surface treated with nitrocellulose.

6. A belt comprising a central body portion of textile fabric treated with a vulcanizable material and a covering of similar material having its exposed surface treated with nitrocellulose.

7. A method of making belts that comprises treating a plurality of layers of fabric with a vulcanizable material, superposing the treated layers, treating fabric upon one side with a vulcanizable material, applying it to the superposed layers with its untreated side exposed, vulcanizing the vulcanizable material of the body thus formed and applying a coating of nitrocellulose to the untreated fabric surface.

8. A method of making belts that comprises forming a body of fabric and a vulcanized material, applying a fabric covering thereto having an untreated exposed surface and applying a coating of nitrocellulose to the untreated surface.

In witness whereof, I have hereunto signed my name in the presence of two subscribing witnesses.

ELMER G. KIMMICH.

Witnesses:
B. J. McDANEL,
L. M. HARTMAN.